United States Patent [19]

Chalaire et al.

[11] Patent Number: 4,669,893
[45] Date of Patent: Jun. 2, 1987

[54] ANNULAR OIL DAMPER ARRANGEMENT

[75] Inventors: Donald K. Chalaire, Palm Beach Gardens; Halfen L. Hoyt; James Hurchalla, both of Stuart, all of Fla.

[73] Assignee: United Technologies Corporation, Hartford, Conn.

[21] Appl. No.: 830,777

[22] Filed: Feb. 18, 1986

[51] Int. Cl.$^4$ ............... F16C 27/00; F16C 39/04
[52] U.S. Cl. .................................. 384/99; 384/535
[58] Field of Search ............... 384/99, 215, 322, 445, 384/456, 462, 535, 581; 74/574

[56] References Cited

U.S. PATENT DOCUMENTS

| | | |
|---|---|---|
| 3,101,980 | 8/1963 | Love . |
| 3,610,712 | 10/1971 | Endress . |
| 3,836,215 | 9/1974 | Dopkin et al. ............... 384/99 |
| 3,844,630 | 10/1974 | Lechner ............... 384/99 |
| 4,527,911 | 7/1985 | Davis ............... 384/99 |
| 4,527,912 | 7/1985 | Klusman ............... 384/99 |

FOREIGN PATENT DOCUMENTS

| | | | |
|---|---|---|---|
| 112421 | 8/1980 | Japan | 384/535 |
| 58-72715 | 4/1983 | Japan | 384/99 |
| 1212599 | 11/1970 | United Kingdom | 384/99 |

Primary Examiner—Stuart S. Levy
Assistant Examiner—Thomas R. Hannon
Attorney, Agent, or Firm—Troxell K. Snyder

[57] ABSTRACT

A fluid damper for controlling transverse orbital movement (14) of a non-rotating cylindrical body (12) is provided with a sealed, fluid filled reservoir (30) in fluid communication with a vent opening (24) disposed in a surrounding support member (10). A sized orifice (34) controls the volumetric flow rate of the damping fluid, maintaining an elevated average static fluid pressure in the annular volume (16) and resisting surge flow into the reservoir (30) through the vent (24) during the periodic occurrence of high fluid pressure in the annular volume (16) adjacent the vent opening (24).

16 Claims, 2 Drawing Figures

ANNULAR OIL DAMPER ARRANGEMENT

The Government has rights in this invention pursuant to Contract No. F33657-84-C-2122.

FIELD OF THE INVENTION

The present invention relates to a method and apparatus for damping cyclical, orbital movement of a cylindrical body, and more particularly, to a damping method and apparatus wherein a flow of damping fluid is supplied within an annular volume formed between the orbiting cylindrical body and a surrounding support member.

BACKGROUND

The occurrence of cyclical, orbital motion in cylindrical bodies is a phenomenon well known in the art of rotating machinery. Such motion is commonly the product of the existence of an imbalance condition in a wheel, shaft, or other like component which results in a wobbling motion having a frequency equal to that of the angular speed of the shaft.

Even the most finely balanced rotating machinery is not always free of this condition, taking for example the central shaft of a gas turbine engine. Although normally operating without significant vibration, this central shaft is occasionally subject to temporary thermal bowing as a result of being held horizontally in a non-moving, rest position for a sufficient length of time. Upon startup of a previously inert engine wherein the central shaft has experienced such bowing, the engine will experience a temporary imbalance condition until such time as the shaft restores itself to operating condition.

As will be appreciated by those skilled in the art of rotating machinery, the existence of an imbalance in a rotating member results in a greatly increased demand on the bearing components to restrain the movement of the rotating member or shaft and to transfer the lateral forces induced by the imbalance into the machinery mounting structure. This increased demand is especially undesirable in high performance gas turbine engines wherein it is preferable to design the shaft bearings and bearing supports so as to minimize rotating friction while accommodating normal bearing loads rather than to provide a bearing which, although resistive to the temporary startup rotor imbalance condition, is far stiffer and heavier than required during normal engine operation.

One method of reducing these lateral and other stresses on the shaft bearings in a gas turbine engine is by the use of a fluid sgueeze damper between the outer portion of the central shaft bearing race and the supporting engine case. The damper is a hydrodynamic system wherein a continuously flowing stream of damping fluid, such as oil, is supplied to an annular volume formed between the non-rotating outer bearing race and the engine support case for the purpose of absorbing and reducing the transverse movement induced by shaft imbalance, temporary or otherwise.

The flowing oil, typically supplied from the engine lubricating system, fills the annular volume and exits through a vent opening typically placed at the top of the annular volume. The vented fluid is allowed to drain into a scavenge sump or the like in the engine from which it is recycled back to the engine and damper by means of a fluid pump.

Fluid squeeze dampers of the prior art as just described have proved effective in absorbing the transverse orbital movement of a gas turbine engine shaft under limited imbalance conditions. Under conditions of extreme shaft wobbling induced by rapid startup of a bowed shaft, prior art dampers are subject to both cavitation of the damping fluid in the annular volume as well as the influx of air through the vent opening, due to the occurrence of local pressures within the annulus that are lower than ambient. The presence of a separated gas component in the annulus significantly reduces damper effectiveness.

The prior art custom of dealing with such damper cavitation and dryout has been to restrict engine startup timing during the initial imbalance period, a program which is less desirable to those engine users who require immediate engine operability, such as the military.

SUMMARY OF THE INVENTION

The present invention provides a damper arrangement and method for controlling the transverse orbital movement of a non-rotating cylindrical body within an outer support wherein a film of oil or other damping fluid is provided in the closed annular volume formed between the cylinder and the support. A substantially continuous, pressurized flow of fluid enters the annulus, subsequently exiting through a vent opening in the outer support.

According to the present invention, a closed reservoir is provided for receiving the vented damping fluid, the reservoir being filled completely by the fluid which then exits a second sized orifice. During orbital movement of the body within the support, a moving circumferential pressure wave preceding the orbiting cylindrical body attempts to drive the hydraulic fluid into the reservoir, a phenomenon which is resisted by the resulting rapid pressure rise in the solid fluid reservoir.

The highly pressurized reservoir subsequently acts to return damping fluid to the annular volume as the low pressure zone trailing the orbiting cylinder moves into communication with the annulus-reservoir vent. The solid (i.e., gas-free) reservoir and fixed size orifice thus act to maintain an overall average pressure and volumetric fluid flow in the annular volume, as well as to resist the periodic, cyclical high and low pressure conditions at the annulus-reservoir vent opening.

The present invention also provides a check valve in the fluid supply line for preventing reverse fluid line flow under the influence of the rotating circumferential pressure wave.

It is therefore an object of the present invention to provide a fluid damping system for an orbiting non-rotating cylindrical body or the like wherein a substantially continuous flow of pressurized damping fluid is admitted to an annular volume formed between the cylindrical body and a surrounding support member.

It is further an object of the present invention to provide a vent for the damping fluid from the annulus into a completely fluid filled, closed reservoir.

It is still further an object of the present invention to reduce the magnitude of the orbital movement of the cylindrical body by resisting the periodic flow of damping fluid into the fluid supply and/or vent openings from the annular volume under the influence of the rotating circumferential pressure wave.

It is still further an object of the present invention to maintain a relatively pressure-independent volume flow of fluid through the reservoir, thereby incurring repeated peaks of internal reservoir fluid pressure as a result of the influence of the annular volume pressure at the vent.

It is still further an object of the present invention to prevent cavitation within the annular volume by maintaining the average fluid pressure within the volume at a sufficient level.

It is still further an object of the present invention to prevent damper dryout due to the reverse influx of air through the vent.

DETAILED DESCRIPTION OF THE PREFERRED EMBODIMENT

Figure 1:
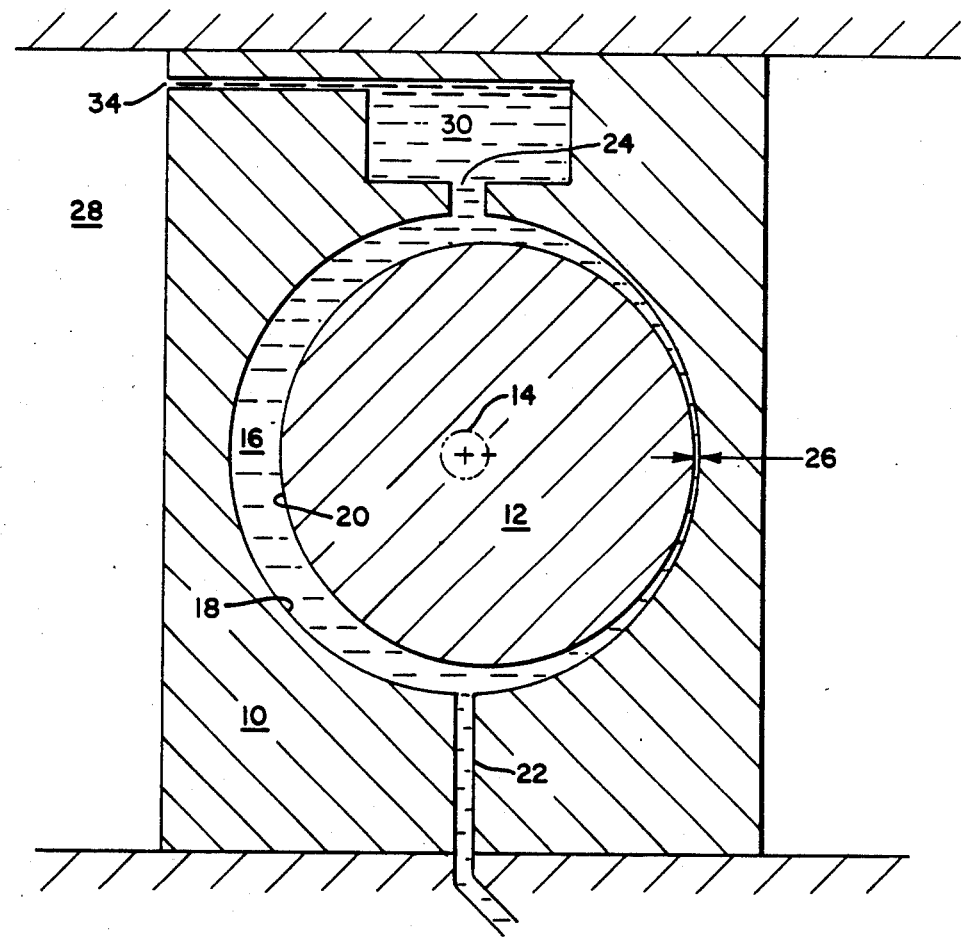
FIG. 1 shows an axial cross sectional view of an annular damper according to the present invention.

Referring specifically to FIG. 1, portions of a typical fluid damper may be seen. Support housing 10 is shown disposed about a cylindrical internal member 12 which is subject to attempted cyclical orbital motion 14. A flow of damping fluid is introduced into the annular volume 16 formed between the inner surface 18 of the support member 10 and the outer surface 20 of the cylindrical member 12 via supply conduit 22.

The fluid fills the annular volume 16, eventually exiting through a vent opening 24 also disposed in the support 10. During operation, the prior art damper thus described absorbs the momentum of the orbiting cylindrical body 12 through viscous and hydrodynamically created forces resulting from the presence of the damping fluid in the annulus 16.

As will be appreciated by a review of FIG. 1, the orbital motion 14 of the cylindrical body 12 causes a circumferential pressure wave to be propagated around the support member surface 18 in advance of the orbiting line of closest approach 26 between the orbiting cylinder 12 and the support 10.

The local fluid pressure reaches a maximum at the line of closest approach 26, thereby exerting a substantial radial opposing force on the orbiting cylinder 12 and preventing undesirable contact between the cylinder and support surfaces 20, 18.

A local region of relatively low pressure also trails the orbiting cylinder 12, with the resulting radial and tangential pressure imbalances, in addition to the viscosity of the damping fluid within the annulus, acting to damp the magnitude of the orbital motion 14 of the cylindrical body 20, translating the absorbed tangential momentum into heat energy within the damping fluid. The continuous renewal of the fluid within the annulus 16 from supply conduit 22 is essential to the continued operation of such dampers.

In prior art systems the vent 24 opens into a low pressure scavenge area or the like wherein the vented damping fluid is collected for subsequent cooling, other usage, or recycle. Such low pressure venting, which is extremely simple to implement, reduces the local fluid pressure within the annulus 16 as the rotating pressure zone passes adjacent to the vent opening 24 in such a prior art damper arrangement. The loss or reduction of local fluid pressure results in a direct reduction of the radial pressure imbalance on the cylindrical body 12 diminishing the effectiveness of such systems in preventing contact between the cylinder 12 and the support member 10.

During periods of vigorous orbital movement 14 of the cylindrical member 12 within the annulus 16, it has additionally been found that the low pressure zone trailing the line of closest approach 26 can induce a periodic reverse flow in the vent 24. For sufficient reverse flow in the vent 24 in prior art systems, a quantity of air may be drawn from the scavenge area 28 into the annular volume 16, a condition which severely limits the effectiveness of any annular fluid damping system.

Moreover, the low pressure zone by itself may create cavitation within the annular volume 16 as the creation of a significantly lower relative pressure within a portion of a fluid system may lead to the separation of previously dissolved gases from within the fluid. This is especially likely in gas turbine engines wherein the damping fluid is typically oil from the lubricating system which is used throughout the engine and hence subject to violent mechanical mixing and shearing in the presence of air. Such oil in a gas turbine engine thus contains a significant amount of air dissolved therein which becomes disassociated from the liquid oil phase under the proper temperature and low pressure conditions.

The present invention avoids drawing air back through the vent 24 and cavitation within the annular volume 16 by supplying a rigid reservoir 30 in fluid communication with the outlet vent 24 as shown in FIG. 1. The rigid, closed reservoir 30 is completely filled with the damping fluid, thus creating a "solid" fluid volume within the reservoir 30.

Fluid pressure is maintained within the annulus 16 and the reservoir 30 by providing a sized orifice 34 in the reservoir 30 for restricting the flow of hydraulic fluid therefrom. It will be appreciated that an excessively large flow of oil through the fluid damper arrangement would be wasteful of both fluid pumping power and volume, particularly in gas turbine engines where damping is only one of the functions performed by the pressurized lubricating oil circulating therein. Orifice 34 is thus sized not only to regulate the volume flow of damping fluid through the damper arrangement shown in FIG. 1, but also to maintain the fluid pressure within the reservoir volume 30 and annulus 16 as high as practicable to prevent separation of dissolved air in the moving low pressure zone.

For typical aircraft gas turbine engines having a lubricating oil supply average pressure of 30–200 pounds per square inch (207–1,380 kPa), the dynamic operating pressures of the reservoir volume 30 and annulus 16 can be in the range of 500 to 2,000 pounds per square inch (3,450 to 13,800 kPa). The fluid mechanics relating orifice size to fluid pressure drop are well known in the art and will not be repeated here, suffice to say that the sizing of orifice 34 is dependent upon a number of practical considerations specific to each individual application.

It is essential to the invention that orifice 34 be fixed in size, thus causing the volumetric flow therethrough to be relatively insensitive to the pressure drop across the orifice. The use of a fixed orifice results in the volumetric flow of fluid therethrough varying as to the square root of the pressure drop. Thus, in the reservoir and orifice arrangement according to the present invention, a fourfold increase in the static fluid pressure of the volume 30 induces at most only a doubling of the volumetric flow of fluid through the orifice 34.

Moreover, this relationship holds only until such time as the velocity of the fluid passing through the orifice 34 remains at less than the speed of sound within the damping fluid. At transonic speeds the orifice 34 becomes a choked nozzle, resulting in even greater relative insensitivity of the volumetric fluid flow with respect to reservoir internal pressure.

The operation of the fluid damper according to the present invention may now be fully appreciated. As the leading high pressure wave passes the vent opening 24, the zone of high pressure attempts to drive the damping fluid through the vent 24 into the reservoir 30. Reservoir 30, being completely filled with the relatively incompressible damping fluid, experiences a nearly instantaneous increase in fluid pressure as a result. The increased fluid pressure in the reservoir volume 30 has a limited effect on the volumetric rate of fluid flow through the exit orifice 34 as discussed above, preventing the reservoir from guickly relieving the high pressure pulse through increased exit fluid flow. The cooperative effort of the solid fluid reservoir 30, fixed orifice 34 and vent 24 thus opposes significant increased flow of damping fluid from the annulus 16 through the vent 24 during the passage of the high pressure zone past the vent opening 24.

Upon passage of the line of closest approach 26 past the vent 24, the pressure in the reservoir is reduced by fluid communication with the trailing low pressure zone in the annulus 16. Although the movement of fluid from the reservoir 30 into the annulus 16 via the vent 24 during this period is very small, the effect is still sufficient to maintain sufficient absolute static pressure of the damping fluid in this area, reducing the likelihood of the occurrence of separation between the dissolved gases and the fluid.

Vent opening 24 must be of sufficient size to allow this dynamic interaction between the oil-filled reservoir and annulus. It will further be appreciated that too large an opening may cause disruption of the rotating pressure wave. These two design considerations must be considered for each individual damper application.

The damping system according to the present invention thus provides a reservoir and orifice arrangement for effectively opposing the cyclical movement of damping fluid from the annulus 16 through the vent 24 under the influence of the rotating pressure wave. The present invention additionally provides a means for preventing the drawing of air or other gas into the annulus 16 by the trailing low pressure zone. The invention further provides, by the use of a sized orifice 34, for the maintenance of an increased overall absolute static fluid pressure in the damper, a condition which prevents the local separation of any dissolved gases from the damping fluid.

In a typical gas turbine engine operating environment, the damping fluid exiting the reservoir 30 through the orifice 34 runs into a collecting sump (not shown) whence it is recycled to the supply conduit 22 by a circulating pump (not shown) or the like. Such systems are nearly universal in the gas turbine engine industry wherein it is additionally desirable to avoid a high circulation rate of the damping fluid (lubricating oil). Such systems may be further augmented by the inclusion of coolers (not shown) or other fluid conditioners.

The use of a check valve for rendering the flow of fluid in the conduit 22 substantially unidirectional has also been found to be desirable in preventing the occurrence of temporary reverse flow in the conduit 22 under the influence of the circumferential pressure wave. By providing effective resistance to the displacement of fluid from the annulus 16 into all of the various flow openings in the support member 10, the damper arrangement according to the present invention thus effectively simulates a completely sealed annular damper, a hypothetical arrangement which is ideal for providing effective damping of orbital movement but which is in reality impractical due to the rapid heating of the damping fluid which would be experienced.

In sizing the internal volume of the reservoir 30, it is important to provide at least sufficient volume to allow the occurrence of the slight reverse flow through the vent 24 during the passing of the trailing low pressure zone without causing the introduction of air into the annulus 16. Conversely, the specification of an overly large reservoir results in a "softening" of the solid volume despite the relatively high incompressibility of the damping fluid.

The range between these two extremes is quite broad, with the actual size of the reservoir 30 most likely being set by other design considerations specific to the particular application, i.e., physical space limitations within the particular engine or apparatus using the damper, the volume of oil available for circulation within the system, etc. In one particular satisfactory test, an annular damper having an annular volume of approximately 0.86 cubic inches (14 cu cm) was provided with a reservoir 30 having a fluid volume 32 of 0.41 cubic inches (6.7 cu cm). The arrangement was found to operate at a performance level far above that of prior art damper systems.

Figure 2:
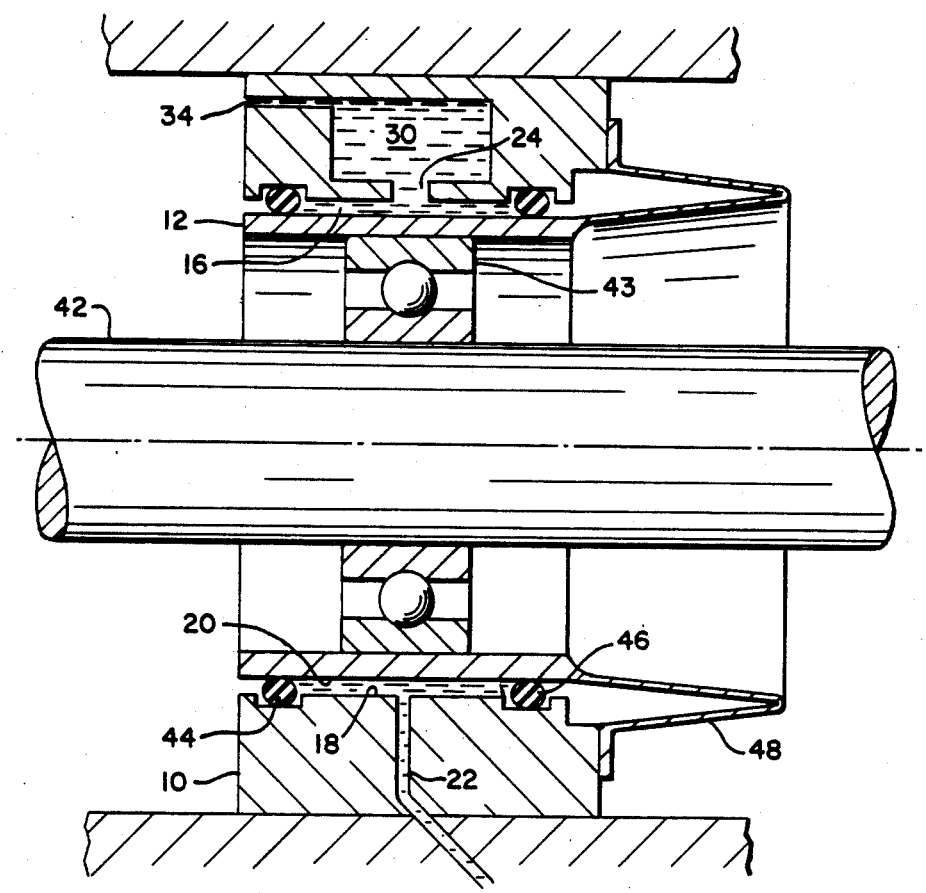
FIG. 2 shows a longitudinal cross sectional view of the damper according to the present invention.

FIG. 2 shows a sectional view of the damper of the present invention taken in the plane of the central shaft axis. The non-rotating cylinder 12 is now more clearly seen in its role as a non-rotating outer bearing race supporting a rotating shaft 42 and bearing assembly 43 therewithin. The annular volume 16 is shown between the cylinder surface 20 and the inner surface 18 of the support member 10. Longitudinal flow of damping fluid from the volume 16 is prevented by longitudinal seals such as elastomeric O-rings 44, 46. Also shown is an annular spring flange 48 secured between the cylinder 12 and the support member 10 for holding the cylinder 12 against longitudinal displacement while allowing relatively free radial movement.

The annular volume 16 is thus defined by a fluid-tight, inflexible structure. The only fluid flow paths to or from the volume 16 are as defined by the vent opening 24 and the supply conduit 22.

This arrangement must be appreciated as being both structurally and functionally distinct from prior art fluid filled bearing configurations (not shown) wherein a layer of lubricating oil is interposed between a rotating shaft and a surrounding support bushing. Such hydrodynamic bearing configurations rely on the rotating shaft to disperse the oil layer, inducing longitudinal lubricant flow by the inclusion of discharge openings at axially opposite ends of the support bushing for venting the lubricant to a scavenge area. Such bearing configurations do not provide the fluid-tight, pressurized, dynamically inflexible annular volume 16 of the damper according to the present invention and are thus unsuitable for effectively resisting orbital movement of the internal member.

Although disclosed and described with respect to the depicted schematic arrangements of the preferred embodiment of the present invention, it should be appreciated that other, equivalent embodiments will be apparent to those skilled in the art and are within the scope of the invention as set forth in the foregoing disclosure and the appended claims and drawing figures.

We claim:

1. An annular oil damper for controlling transverse orbital movement of a non-rotating cylindrical member within a surrounding support member, comprising:
   means for supplying a flow of damping fluid into a fluid-tight annular volume defined between the interior surface of the support member and the exterior surface of the cylindrical member;
   means for venting the damping fluid from the annular volume;
   an enclosed reservoir, defining an internal volume of fixed magnitude and in fluid communication with the venting means, for receiving and holding an equivalent solid volume of damping fluid therein; and
   an orifice, disposed in the reservoir for conducting the damping fluid therefrom, the orifice defining a fixed flow area.

2. The damper as recited in claim 1, further comprising:
   first and second means, disposed between the cylindrical body and the support member for sealing axially spaced apart first and second ends of the annular volume against leakage of damping fluid therefrom.

3. The damper as recited in claim 2, wherein the damping fluid supply means comprises a conduit, passing through the support member and opening into the annular volume, and
   a fluid pump for providing a flow of pressurized damping fluid in the conduit.

4. The damper as recited in claim 3, further comprising:
   a check valve, disposed in the supply conduit proximate the annular volume, for preventing any reverse flow of damping fluid from the annular volume into the supply conduit.

5. The damper as recited in claim 2, wherein the first and second sealing means comprise first and second elastomeric O-rings.

6. The damper as recited in claim 1, wherein the venting means defines a fluid flow path of sufficient cross section to provide substantially unrestricted flow between the reservoir and the annular volume.

7. The damper as recited in claim 1, wherein the damping fluid supply means comprises a conduit, passing through the support member and opening into the annular volume, and
   a fluid pump for providing a flow of pressurized damping fluid in the conduit.

8. The damper as recited in claim 7, further comprising:
   a check valve, disposed in the supply conduit proximate the annular volume, for preventing any reverse flow of damping fluid from the annular volume into the supply conduit.

9. In an annular fluid damper for suppressing orbital movement of a non-rotating cylindrical body within a surrounding support member, the damper receiving a flow of damping fluid into a sealed annular volume formed between the cylindrical body and the support member via a supply conduit, and exhausting the flowing fluid from the annular volume through a vent opening in the support member, the improvement comprising:
   means, in fluid communication with the vent opening, for opposing the cyclical surge of damping fluid from the annular volume induced by the orbiting zone of relatively high pressure and for preventing the entry of gas into the annular volume through the vent opening as a result of the subsequent orbiting zone of low pressure.

10. The improved damper as recited in claim 9, wherein
   the opposing and preventing means includes
   a closed reservoir having an internal volume for receiving the vented fluid and being completely filled thereby; and
   a sized, fixed orifice, disposed in fluid communication with the reservoir, for regulating the volumetric flow of damping fluid at a rate relatively independent of the pressure in the reservoir.

11. The improved damper as recited in claim 10, wherein the improvement further comprises
   a check valve disposed in the supply conduit for preventing any reverse flow of damping fluid therein.

12. The improved damper as recited in claim 9, wherein the improvement further comprises
   a check valve disposed in the supply conduit for preventing any reverse flow of damping fluid therein.

13. A method for controlling repeating, high frequency orbital motion of a non-rotating cylindrical body within a surrounding housing, comprising the steps of:
   supplying a unidirectional, pressurized flow of damping fluid to the annular volume formed between the cylindrical body and the support housing;
   venting the damping fluid from the annular volume into a fluid filled closed reservoir;
   controlling the rate of damping fluid exiting the reservoir to a pre-selected, relatively pressure-independent flow rate,
   collecting the damping fluid from the reservoir for recycling to the annular volume by the fluid supplying step.

14. The method as recited in claim 13, wherein the step of controlling the flow rate of damping fluid exiting the reservoir includes the step of
   providing a fixed exit orifice in the reservoir.

15. The method as recited in claim 14, wherein the step of supplying a unidirectional, pressurized damping fluid includes the step of
   providing a check valve in the flow of damping fluid supplied to the annular volume.

16. The method as recited in claim 13, wherein the step of supplying a unidirectional, pressurized damping fluid includes the step of
   providing a check valve in the flow of damping fluid supplied to the annular volume.

* * * * *